United States Patent [19]

Agarwal

[11] 4,281,104

[45] Jul. 28, 1981

[54] LINEAR RANDOM COPOLYESTER PIGMENT BINDERS

[75] Inventor: Maya Agarwal, Seaford, Del.

[73] Assignee: The Goodyear Tire & Rubber Company, Akron, Ohio

[21] Appl. No.: 121,756

[22] Filed: Feb. 15, 1980

[51] Int. Cl.$^3$ .................................................. C08G 63/16
[52] U.S. Cl. ..................................... 528/302; 528/309; 427/127
[58] Field of Search ............................. 528/302, 309

[56] References Cited

U.S. PATENT DOCUMENTS

| | | |
|---|---|---|
| 3,992,346 | 11/1976 | Hartmann et al. .................. 528/302 |
| 4,025,694 | 5/1977 | Pletcher et al. ................. 528/302 X |
| 4,065,439 | 12/1977 | Uno et al. ............................. 528/302 |
| 4,186,227 | 1/1980 | Wulff et al. ...................... 528/302 X |

*Primary Examiner*—Lucille M. Phynes
*Attorney, Agent, or Firm*—J. P. Ward

[57] ABSTRACT

Novel linear random copolyesters which exhibit a high degree of solubility in organic solvents, are completely or essentially free of cyclic oligomeric contaminants and are useful for bonding metallic oxide pigments to magnetic tape substrates.

4 Claims, No Drawings

LINEAR RANDOM COPOLYESTER PIGMENT BINDERS

TECHNICAL FIELD

This invention relates to compositions of matter comprising linear random copolyesters useful for bonding metallic oxide pigments to magnetic tape substrates. More particularly, the invention relates to linear random copolyesters which are completely or essentially free of cyclic oligomeric contaminants and which exhibit a high degree of solubility in common organic solvents.

BACKGROUND OF THE INVENTION

Random copolyester compositions derived from various reactive mixtures of alkylene diols, aromatic dicarboxylic acids and/or their reactive equivalents and aliphatic dicarboxylic acids and/or their reactive equivalents have attained a high degree of commercial success for use in a wide variety of applications involving the bonding together of various materials. Depending on the precise application involved and/or the nature of the materials to be bonded together these copolyesters are generally employed either in the form of a hot melt or as a solution adhesive wherein the copolyester is dissolved in a suitable solvent. Furthermore, in many instances, such copolyesters must generally be tailored to the specific application for which they are intended if the proper balance of mechanical, chemical and thermal properties required by the application is to be achieved.

Although, as noted above, random copolyesters have found widespread useage in bonding applications, one area in which random copolyesters have not found ready acceptance is in the area of bonding agents for adhering metallic oxide pigments to magnetic tape substrates. Copolyesters which have been investigated for use as solution adhesives in this particular product application either did not have the proper balance of mechanical, chemical and thermal properties, or if they did, they contained low molecular weight cyclic oligomeric contaminants, believed to be formed during the preparation of the copolyester, which migrated to the surface of the magnetic tape during storage. Subsequently these contaminants would be wiped off on electric tape recording and pickup heads resulting in serious audio, visual and/or other interference problems. As a result, the most predominant elastomeric materials in use in the magnetic tape industry today for bonding metallic oxide pigments to magnetic tape substrates are the thermoplastic polyurethanes.

In contrast to the copolyesters previously investigated, applicant has now discovered a class of linear random copolyesters which possess the proper balance of mechanical, chemical and thermal properties, form stable solutions in common organic solvents at high concentrations and which are completely or essentially free of any low molecular weight cyclic oligomeric contaminant. This combination of properties and characteristics makes the copolyesters of this application excellent agents for bonding metallic oxide pigments to magnetic tape substrates.

DISCLOSURE OF THE INVENTION

The present invention provides for compositions of matter consisting essentially of linear, random copolyesters having intrinsic viscosities of at least 0.4 deciliters per gram as determined in a 60/40 by volume mixed solvent system of phenol and tetrachloroethane at 30° C., which are suitable for use as organic solvent based adhesives for bonding metallic oxide pigments to magnetic tape substrates, said copolyesters comprising the polymeric reaction product of a mixture of reactants consisting of (a) ethylene glycol, (b) the ester glycol, neopentyl glycol hydroxypivalate, (c) terephthalic acid or a lower $C_1$-$C_4$ dialkyl ester thereof, (d) phthalic acid or phthalic anhydride, (e) an aliphatic dicarboxylic acid selected from the group consisting of unsubstituted and lower alkyl substituted aliphatic dicarboxylic acids containing from 5 to 12 carbon atoms in the linear chain or lower $C_1$-$C_4$ dialkyl ester thereof in which mixture the amount of ethylene glycol ranges from 60 to 90 mole percent and the amount of the ester diol ranges from 10 to 40 mol percent said percentages being based on the total number of moles of these glycol components in the mixture and in which mixture the amount of terephthalic acid or lower $C_1$-$C_4$ dialkyl ester thereof ranges from 50 to 60 mole percent, the amount of phthalic acid or phthalic anhydride ranges from 15 to 30 mole percent and the amount aliphatic dicarboxylic acid or lower $C_1$-$C_4$ dialkyl ester thereof ranges from 15 to 30 mole percent, said percentages being based on the total moles of the acid components or reactive equivalents thereof in said mixture. A more preferred range for the glycol components in the above defined reactive mixture is from 60 to 80 mole percent for ethylene glycol and from 20 to 40 mole percent for the ester glycol. For the acid components or their reactive equivalents in the above reactive mixture a more preferred range for the phthalic acid or phthalic anhydride is from 15 to 25 mole percent and for the aliphatic dicarboxylic acid or lower $C_1$-$C_4$ dialkyl ester thereof is from 15 to 25 mole percent.

The ester glycol employed in preparing the random copolyesters of the instant invention, is the product of the reaction of neopentyl glycol and hydroxy pivalic acid and has the structural formula:

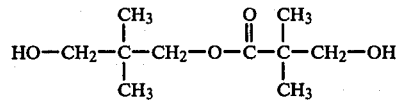

This bis-primary alcohol is defined chemically as 2,2-dimethyl-3-hydroxypropyl-2,2-dimethyl-3-hydroxypropionate and is also known chemically as neopentylglycol hydroxypivalate.

BEST MODE FOR CARRYING OUT THE INVENTION

The linear random copolyesters of the present invention and derived from the reaction mixture defined hereinabove are prepared by the conventional and well-known techniques used in preparing high molecular weight linear polyesters. In general, the copolyesters are prepared by first subjecting the mixtures of reactants to elevated temperatures under an inert gas atmosphere at atmospheric or superatmospheric pressures in the presence of a catalyst to promote the esterification or combined transesterification/esterification reactions, depending on the nature of the starting materials, between the glycol constituents and the acid constituents or reactive equivalents thereof comprising said mixtures. Known catalysts useful in promoting these reactions include the zinc, magnesium, calcium, manganese, lead and titanium containing compounds. The temperatures normally employed to affect the esterification or combined transesterification/esterification reactions will generally range from 150° C. to 230° C. and preferably from 190° C. to 225° C.

Following completion of the esterification or the combined esterification/transesterification reaction, the low molecular weight oligomer product produced thereby is subjected to polycondensation. The polycondensation reaction will be carried out at temperatures ranging from 220° C. and 270° C. and preferably from 240° C. to 260° C. at pressures below 15 and preferably below 1 millimeter of mercury (mmHg) pressure in the presence of a polycondensation catalyst such as the known antimony, titanium, iron, zinc, cobalt, lead, manganese, niobium or germanium catalysts.

EXAMPLE 1

A linear random copolyester of the present invention was prepared from a mixture of reactants comprising ethylene glycol (EG), ester glycol (ED), dimethyl terephthalate (DMT), phthalic anhydride (PA) and azelaic acid (Az), wherein said glycol constituents were present in said mixture with respect to each other in the ratio of 70/30 (EG/ED) mole percent and said acid constituents or reactive equivalents thereof were present in said mixture with respect to each other in the ratio of 53/17/30 (DMT/PA/Az) mole product. The preparation of this copolyester from this mixture was as follows:

To a heated (190° C.) stainless steel reactor, equipped with a stirrer, gas inlet and condenser were added 773.2 grams of DMT, 544.0 grams of EG and 0.65 grams of zinc acetate. Under a nitrogen atmosphere of about 760 mm HG pressure, this mixture was slowly heated with stirring, from 190° C. to 230° C. and maintained at 230° C. for a period of 3.0 hours at which time the reaction was considered complete as determined by the amount of by-product methanol distilled from the reactor. Then 460.4 grams of ED, 189.2 grams of PA and 424.1 grams of Az were charged to the reactor and the temperature of the mixture raised to 250° C. The reaction was continued for a period of 1.5 hours at which time the reaction was considered complete as determined by the amount of water distilled from the reactor. The low molecular weight oligomeric intermediate product was then transferred to a second heated (240° C.) stainless steel reactor equipped in the same manner as the first reactor and in addition attached to a vacuum drawing means. Upon completion of the transfer of this intermediate product to the second reactor, 30 grams of antimony trioxide ($Sb_2O_3$) were then added, the reactor was evacuated to a pressure of about 0.4 mm Hg pressure and the temperature increased to 270° C. to affect polycondensation of the intermediate product to high molecular weight polymeric copolyester. The polycondensation reaction was carried out for a period of 4.0 hours at the end of which time the copolyester was discharged from the reactor.

The copolyester prepared in the manner described above had a density of approximately 1.20 grams/cc and an intrinsic viscosity (IV) of 0.801 as measured in a 60/40 by volume mixed solvent system of phenol and tetrachloroethane at 30° C. The copolyester formed clear solutions in methyl ethyl ketone (MEK) solvent at the 45% by weight solids level, i.e. 45 parts by weight of the copolyester per 100 parts by weight of the copolyester and solvent combined. These copolyester/solvent solutions remained clear, did not develop any hazy appearance and did not form any gel on standing over a period of six weeks.

EXAMPLE 2

A sample of the copolyester prepared in Example 1 above was subjected to a sublimation test to determine the presence, if any, of cyclic oligomeric contaminants. The test was carried out over a period of 80 hours at temperatures ranging from 150° C. to 210° C. at a pressure of about 0.2 mm Hg. The test was monitored by visual observation of the surface of the cold finger inserted into the sublimation apparatus and positioned directly above the copolyester sample contained in the apparatus. Specific data are set forth in Table 1 below.

TABLE 1

| Temperature °C. | Time Hours | Sublimate gms |
|---|---|---|
| 150 | 24 | None |
| 190 | 28 | None |
| 210 | 28 | None |
| Total | 80 | None |

EXAMPLE 3

A linear random copolyester of the present invention was prepared from a mixture comprised of the same reactants as employed in Example 1 above, i.e. EG, ED, DMT, PA and Az. However, in the mixture of this Example 3 the glycol constituents were present in said mixture with respect to each other in the ratio of 75/25 (EG/ED) mole percent. The acid constituents or the reactive equivalents thereof present in this mixture were in the same mole percent ratio to each other as in the reaction mixture of Example 1 above. The preparation of the copolyester was as follows:

To a heated (150° C.) glass tube reactor equipped with a stirrer, gas inlet, condenser and vacuum line were added 22.32 grams of EG (inclusive of a 20% excess), 20.42 grams of ED, 41.17 grams of DMT and 0.025 grams of zinc acetate as the catalyst. Under a nitrogen atmosphere of about 760 mm Hg pressure, this mixture was heated to and maintained at a temperature of 190° C. until all evolution of by-product methanol had ceased signifying completion of the transesterification reaction. To this mixture was then added 10.06 grams of PA. The temperature of the mixture was then increased to 200° C. and after approximately 15 minutes at 200° C., 22.6 grams of Az were then added to the mixture. The temperature was increased to 225° C. The reaction was continued until distillation of by-product water from the reactor had ceased. Then 0.025 gram of $Sb_2O_3$ polycondensation catalyst was added to the low molecular weight oligomeric intermediate product formed in the reactor and evacuation of the nitrogen atmosphere in the reactor was begun and the temperature of said intermediate product increased to 240° C. When the pressure in the reactor had been reduced to 0.3 mm Hg pressure, the temperature was increased to 255° C. and the polycondensation of the intermediate product continued for a period of 2 hours. At the end of this time the finished copolyester product was discharged from the reactor. This copolyester product was analyzed for IV, density, carboxyl (COOH) end group concentration and glass transition temperature (Tg°C.). The values for these properties were as follows:

IV: 0.55 dl/gm
Density: <1.218 gm/cc
COOH: 18 equivalents per $10^6$ grams of copolyester
Tg°C.: 4.0

The copolyester formed clear, stable solutions of MEK and the solvents at 20% and 30% by weight solids levels.

EXAMPLE 4

A series of linear random copolyesters was prepared from a variety of mixtures comprised of EG, ED, DMT, PA and Az in the same manner and under approximately the same conditions of time, temperature and pressure as employed in Example 3. The mixtures employed in the preparation of the copolyester of this Example 4 varied from each other only in respect to the mole percent ratios of the glycol constituents to each other and in the mole percent ratios of the acid constituents or the reactive equivalents thereof to each other in said mixtures. The copolyesters prepared from these mixtures were analyzed for I.V., density, COOH content, Tg and solubility in MEK and THF solvents at the 20% and 30% by weight solids level. All pertinent data are set forth in Table 2 below:

TABLE 2

| Copoly-ester No. | | Composition (b) EG/ED/DMT/PA/AZ | IV dl/gm | Density gm/cc | COOH Eq/$10^6$ g | Tg °C. | Solubility MEK | | THF (c) |
|---|---|---|---|---|---|---|---|---|---|
| | | | | | | | 20% | 30% | 30% |
| 1 | | 60/40/53/17/30 | 0.51 | 1.218 | 20 | 6 | sol. (d) | sol. | sol. |
| 2 | | 65/35/53/17/30 | 0.59 | 1.218 | 13 | 1 | " | " | " |
| 3 | (a) | 75/25/53/17/30 | 0.55 | 1.218 | 18 | 4 | " | " | sol. |
| 4 | | 80/20/53/17/30 | 0.54 | 1.219 | 9 | 2 | " | " | " |
| 5 | | 70/30/50/25/25 | 0.40 | 1.218 | 26 | 6 | " | " | " |
| 6 | | 70/30/55/20/25 | 0.45 | 1.218 | 13 | 6 | " | " | " |
| 7 | | 70/30/55/25/20 | 0.44 | 1.266 | 12 | 12 | " | " | " |
| 8 | | 70/30/60/20/20 | 0.64 | 1.228 | 38 | 14 | " | " | " |
| 9 | | 70/30/60/30/10 | 0.55 | 1.245 | 29 | 24 | " | " | " |
| 10 | | 90/10/60/30/10 | 0.57 | 1.238 | 25 | 4 | p.sol. (e) | gel | sol. |
| 11 | | 90/10/60/20/20 | 0.56 | 1.267 | 28 | 24 | gel | " | " |

(a) Copolyester from Example 3
(b) Mole % ratio - as charged initially
(c) THF - tetrahydrofuran
(d) Sol. - Soluble
(e) p.sol. - partly soluble The above examples illustrate the preparation, physical properties and solubility in various solvents of a number of copolyesters representative of the random copolyesters of the present invention. They were derived from the transesterification/esterification and subsequent polycondensation of various mixtures of ethylene glycol/ester glycol dimethyl terephthalate, phthalic anhydride and azelaic acid. However, these copolyesters are also capable of being prepared starting with terephthalic acid and phthalic acid in place of the respective dimethyl ester and acid anhydride. In addition, aliphatic dicarboxylic acids other than azelaic acid and $C_1$–$C_4$ dialkyl esters thereof can be employed, including for example glutaric acid, adiptic acid, pimelic acid, suberic acid, sebacic acid, dodecanedioic acid and alkyl substituted aliphatic dicarboxylic acids such as 2,2'-dimethyl sebacic acid, 2,5-dimethyl adipic acid, 2-methyl sebacic acid and the like and esters such as diisobutyl adipate, dimethyl sebacate, dibutyl sebacate and the like.

The copolyesters of this invention are high molecular weight materials. Thus, these copolyesters will have intrinsic viscosities ranging from about 0.4 to 1.0 deciliters per gram as measured in a 60/40 phenol/tetrachloroethane mixed solvent system at 30° C. In addition, the copolyesters of this invention are amorphous having densities ranging from about 1.20 to about 1.33 grams per milliliter and are further characterized by glass transition temperatures ranging from 0° C. to about 25° C.

The solubility of these copolyesters has been demonstrated in such solvents as tetrahydrofuran and methyl ethyl ketone. Additional representative examples of organic solvents in which these copolyesters have been found to be soluble include toluene, acetone, methyl propyl ketone, cyclohexanone, ethyl acetate, methyl cellosolve acetate, cellosolve acetate, methylene chloride, ethylene dichloride, trichloroethylene and the like.

Although the random copolyesters of the present invention exhibit excellent solubility in solvents such as those listed above, certain guidelines must be observed when adhesive solutions employing non-polar or slightly polar solvents such as methyl ethyl ketone in which the copolyester is present in said solvents in the 20 to 45 percent by weight solids range are desired. For example, from solubility studies conducted on random copolyesters prepared from mixtures wherein the terephthalic acid component or reactive equivalent thereof was at its uppermost limits, i.e. 60 mole percent of the total acid components in said mixtures, and wherein the ethylene glycol component was at its uppermost limit, i.e. 90 mole percent of the total glycol components in said mixture, such copolyesters were observed to be only partially soluble or to form gels in non-polar or slightly polar solvents in the concentrations noted above. However, random copolyester prepared from mixtures wherein neither this particular acid component nor this particular glycol component were present in said mixtures at their uppermost limit or only one of these two reactants was at such limit the resulting random copolyesters derived from said mixtures were completely soluble in such non-polar or slightly polar solvents at all concentrations evaluated, including the ranges noted above. On the other hand, copolyesters derived from mixtures or reactants wherein the terephthalic acid component or its reactive equivalent and the ethylene glycol were present in said mixtures at the levels indicated exhibited complete solubility in polar solvents such as tetrahydrofuran at concentrations as high as 60 percent by weight copolyester. Based on these findings, those skilled in the art can readily determine the degree of solubility of any particular copolyester composition in any given organic solvent medium.

INDUSTRIAL APPLICABILITY

The linear random copolyesters described herein have properties which make them highly desirable for use as solution adhesives. The copolyesters have low glass transition temperatures, are essentially amorphous, exhibit a very high degree of solubility in various solvents and are completely or essentially free of low molecular weight cyclic oligomeric contaminants. These characteristics together with other desirable properties render these copolyesters particularly suitable for use bonding metal oxide pigments, such as iron oxide, to magnetic tape substrates, such as for example "Mylar" polyester film.

While certain representative embodiments and details have been shown for the purpose of illustrating the invention, it will be apparent to those skilled in this art that various changes and modifications may be made therein without departing from the spirit or scope of the invention.

I claim:

1. As compositions of matter, linear random copolyesters having intrinsic viscosities of at least 0.4 deciliters per gram as determined in a 60/40 by volume mixed solvent system of phenol and tetrachloroethane at 30° C., said copolyesters being essentially free of cyclic oligomeric contaminants and which are suitable for preparing clear solvent based adhesive solutions for bonding metallic oxide pigments to magnetic tape substrates, said copolyesters comprising the polymeric reaction product of a mixture of reactants consisting of
    (a) ethylene glycol,
    (b) the ester glycol, neopentyl glycol hydroxypivalate,
    (c) terephthalic acid or a lower $C_1$–$C_4$ dialkyl ester thereof,
    (d) phthalic acid or phthalic anhydride, and
    (e) an aliphatic dicarboxylic acid selected from the group consisting of unsubstituted and lower alkyl substituted aliphatic dicarboxylic acids containing from 5 to 12 carbon atoms in the linear chain or lower $C_1$–$C_4$ dialkyl esters thereof in which mixture the amount of ethylene glycol ranges from 60 to 90 mol percent and the amount of neopentyl glycol hydroxypivalate ranges from 10 to 40 mol percent, said percentages being based on the total mols of glycol components in the mixture and in which mixture the amount of terephthalic acid or lower $C_1$–$C_4$ dialkyl ester thereof ranges from 50 to 60 mol percent, the amount of phthalic acid or phthalic anhydride ranges from 15 to 30 mol percent and the amount of aliphatic dicarboxylic acid or lower $C_1$–$C_4$ ester thereof ranges from 15 to 30 mol percent said percentages being based on the total mols of the acid constituents or reactive equivalents thereof in said mixture.

2. The compositions of claim 1 wherein said copolyesters are the polymeric reaction products of a mixture of reactants consisting of ethylene glycol, neopentyl glycol hydroxypivalate, terephthalic acid, phthalic anhydride and azelaic acid.

3. The compositions of claim 1 wherein said copolyesters are the polymeric reaction products of a mixture of ethylene glycol, neopentyl hydroxypivalate, dimethyl terephthalate, phthalic anhydride and azelaic acid.

4. The composition of either claims 2 or 3 wherein said polyesters have intrinsic viscosities ranging from 0.4 to 1.0 deciliters per gram as determined in a 60/40 by volume mixed solvent system of phenol and tetrachloroethane at 30° C., densities ranging from 1.20 to about 1.33 grams per milliliters and glass transition temperatures ranging from about 0° C. to about 25° C.

* * * * *